United States Patent [19] [11] 4,341,880
Toyoda et al. [45] Jul. 27, 1982

[54] RESIN COMPOSITIONS OF IMPROVED HUE

[75] Inventors: Takashi Toyoda; Yozo Ohba; Masaaki Yamanaka, all of Hasaki, Japan

[73] Assignee: Oji Yuka Goseishi Kabushiki Kaisha, Tokyo, Japan

[21] Appl. No.: 236,303

[22] Filed: Feb. 20, 1981

[30] Foreign Application Priority Data

Feb. 26, 1980 [JP] Japan ................................ 55-23265

[51] Int. Cl.³ .................. C08L 23/00; C08L 23/06; C08L 23/12
[52] U.S. Cl. ................................. 524/101; 524/120; 524/151; 524/128; 524/427; 524/570; 524/583; 524/584; 524/586; 524/587
[58] Field of Search .................... 260/23 H, 45.7 PH

[56] References Cited

U.S. PATENT DOCUMENTS 3,882,061 5/1975 Bontinck et al. ................ 260/23 H
4,120,844 10/1978 Meyer et al. ..................... 260/23 H
4,261,880 4/1981 Fujii et al. ..................... 260/45.7 PH

FOREIGN PATENT DOCUMENTS 731236 3/1966 Canada .
50-21045 6/1975 Japan .

OTHER PUBLICATIONS

Chemical Abstracts, vol. 77, No. 12, Sep. 18, 1972, Item 76067n.

*Primary Examiner*—Ronald W. Griffin
*Attorney, Agent, or Firm*—Wenderoth, Lind & Ponack

[57] ABSTRACT

A resin composition of improved hue which comprises, in specified proportions, an olefin-based resin such as polypropylene and at least three specified antioxidants which are (1) 2,6-di-t-butyl paracresol, (2) tri(mono- and/or di-nonylphenyl)phosphite and/or distearyl pentaerythritol diphosphite, and (3) tris(3,5-di-t-butyl-4-hydroxybenzyl)isocyanurate and/or octadecyl-3-(3,5-di-t-butyl-4-hydroxyphenyl)-propionate.

13 Claims, No Drawings

RESIN COMPOSITIONS OF IMPROVED HUE

BACKGROUND OF THE INVENTION

The present invention relates to resin compositions containing inorganic finely divided powders which are improved in hue. Films produced by forming the compositions of the present invention are useful particularly as printing films requiring excellent hue.

It is known that a film exhibiting excellent printability and writability can be obtained by forming a composition comprising an olefin-based resin having blended therein an inorganic finely divided powder, such as calcium carbonate powder, into a film and by stretching the film (Japanese Patent Application Publication Nos. 46-4678 (1971), 46-34896 (1971), 46-40794 (1971) and 48-3902 (1973)).

As the inorganic finely divided powder of this type, calcium carbonate powders which are inexpensive, exhibit a high degree of whiteness and are stably available are preferably used. However, it has been found that in the case where the olefin-based resin composition contains, in addition to the calcium carbonate powders, other additives such as antioxidants, ultraviolet light absorbers, dispersing agents and lubricants, films formed from such a composition are changed to yellow or red in color when exposed to heat or noxious gases, which results in a substantial reduction in the value of the film.

For example, polypropylene-based compositions containing therein calcium carbonate as an inorganic finely divided powder and a mixture of "Topanol CA" [trade name, tris(2-methyl-4-hydroxy-5-t-butylphenyl)-butane, manufactured by ICI Co.] and "Ionox 330" [trade name, 1,3,5-trimethyl-2,4,6-tris(3,5-di-t-butyl-4-hydroxybenzyl)benzene, manufactured by Shell Chemical Co.] as an antioxidant result in films which are yellowed when they are exposed to heat or allowed to stand at room temperature for a long period of time.

Also, if titanium dioxide, known as an extender pigment, is blended into the above mentioned polypropylene-based composition in order to increase the whiteness of the film resulting therefrom, the resulting film tends to become yellow to a greater extent.

We have carried out various studies to find antioxidants and dispersing agents which are effective for preventing the yellowing and reddening of a film resulting from an olefin-based composition having mixed therein calcium carbonate as an inorganic finely divided powder when they are added to the composition. As a result, we have found that only when a combination of two or more specific phenolic antioxidants and a phosphorus antioxidant and a specific fatty acid as a dispersing agent are used, the yellowing and reddening of the resulting film can be effectively prevented. This invention is based on this discovery.

SUMMARY OF THE INVENTION

The present invention provides an olefin-based resin composition of improved hue which comprises 100 parts of an olefin-based resin, 3 to 300 parts of finely divided calcium carbonate, 0.05 to 5 parts of a fatty acid having no less than 12 carbon atoms, and at least three members selected from the following antioxidants (a) through (c) in the stated proportions:

| | |
|---|---|
| (a) 2,6-di-t-butyl paracresol, | 0.05 to 1 part; |
| (b) an antioxidant selected from the group consisting of tri(mono- and/or di-nonyl phenyl)phosphite and di-stearyl pentaerythritol di-phosphite, | 0.05 to 1 part; and |
| (c) an antioxidant selected from the group consisting of tris(3,5-di-t-butyl-4-hydroxybenzyl)isocyanurate and octadecyl-3-(3,5-di-t-butyl-4-hydroxyphenyl)-propionate, | 0.05 to 1 part. |

Throughout this disclosure, all quantities expressed in parts are by weight.

DETAILED DESCRIPTION OF THE INVENTION

Examples of the olefin-based resin which can be used in the present invention includes homopolymers of olefins such as ethylene, propylene and butene-1, particularly, ethylene and propylene, and copolymers of two or more of the above mentioned olefins such as ethylene-propylene resinous copolymers; ethylene-vinyl acetate copolymers, particularly, those comprising a predominant amount of ethylene; and ethylene-methyl acrylate copolymers, particularly, those comprising a predominant amount of ethylene. Among these, homopolymers of or copolymers comprising a predominant amount of an olefin selected from the group consisting of ethylene and propylene are preferable. From the point of view of the mechanical strength of the resulting film, polypropylenes and high density polyethylenes having a density of from about 0.94 to 0.97 are preferable.

These olefin resins may be used singly or as mixtures of two or more thereof.

The powdered calcium carbonate to be blended into the olefin-based resin preferably has an average particle size of 0.1 to 5 microns. The powdered calcium carbonate is blended into the olefin-based resin in a quantity of from 3 to 300 parts, preferably, from 25 to 100 parts per 100 parts of the olefin-based resin. If the quantity of the powdered calcium carbonate is less than 3 parts, the resultant film will have unsatisfactory printability and writability. If the powdered calcium carbonate is blended in a quantity of 25 parts or more, the resultant film will exhibit excellent printability and writability which are equivalent to those of a conventional pulp paper.

On the other hand, if the powdered calcium carbonate exceeds 300 parts, the resultant composition will exhibit poor film-forming property, and the mechanical strength of the resultant film will also become extremely inferior. In addition, the blended powder particles tend to fall off from the surface of the resultant film. If the content of the calcium carbonate in the composition is not greater than 100 parts, the resultant composition will exhibit excellent formability; and when this composition is subjected to film-forming and stretching procedures, no rupturing of the result film occurs, and there is obtained film which has little aggregation of the calcium carbonate powder particles, and exhibits excellent gravure printability.

A part of the calcium carbonate powder may be replaced by finely divided titanium dioxide. In this case, the titanium dioxide is used in a quantity of up to 60 parts, particularly, from 5 to 60 parts per 100 parts of the olefin-based resin. The titanium dioxide contributes to a further increase in the whiteness, opaqueness and weathering resistance of the resulting film. In the case of olefin-based resin compositions containing conventional antioxidants, the use of a combination of the calcium carbonate and the titanium dioxide causes the resultant film to exhibit a high tendency to become discolored. In contrast, in the case of olefin-based resin compositions containing the antioxidants according to the present invention, the use of such a combination causes little discoloration of the resultant film.

Examples of the fatty acid having 12 or more carbon atoms which can be used in the present invention are oleic acid, stearic acid, and palmitic acid. Oleic acid is preferable. These fatty acids may be used singly or in mixture. The fatty acid is used in a quantity of from 0.05 to 5 parts per 100 parts of the olefin-based resin. The fatty acid serves to facilitate the distribution of the finely divided inorganic materials throughout the resin composition. The fatty acid contributes to a further improvement in the hue of the resin composition. The fatty acid is preferably monocarboxylic, and the upper limit of the number of carbon atoms of the fatty acid is preferably 12–22.

In addition, the above mentioned resin compositions having blended therein, as an additional component, 0.05 to 5 parts of bis(2,2,6,6-tetramethyl-4-piperidyl)-sebacate are useful as a material for a film exhibiting excellent light resistance and hue.

The resin composition as prepared above is melted and kneaded by using an extruder. The kneaded composition is then formed into a film by an inflation method or a T-die method. The resultant film is stretched at least uniaxially at a temperature lower than the melting point of the olefin resin for purposes such as enhancing the printability and mechanical strength of the film or imparting a pulp paper-like feel to the film.

If a uniaxially stretched film is desired, a stretch ratio of at least 1.3, preferably, from 2.5 to 10, is used. If a biaxially stretched film is desired, the film is stretched at a ratio of stretched area to non-stretched area of 5 to 50.

The so stretched film exhibits excellent printability and writability. Even if the film is stored for a long period of time or is exposed to an elevated temperature for a long period of time, it undergoes no discoloration and retains a high degree of whiteness and a pulp paper-like feel.

In order to indicate more fully the nature and utility of this invention, the following specific examples of practice are set forth, it being understood that these examples are presented as illustrative only and that they are not intended to limit the scope of the invention.

EXAMPLES 1 THROUGH 11 AND
COMPARATIVE EXAMPLES 1 THROUGH 6

A composition comprising 90 parts of polypropylene (available under the trade name of "Noblene MA-6," manufactured by Mitsubishi Petrochemical Co., Ltd.), 10 parts of high density polyethylene (available under the trade name of "Yukalon Hard EY-40", manufactured by Mitsubishi Petrochemical Co., Ltd.), 10 parts of calcium carbonate (available under the trade name of "Whiton," manufactured by Shiraishi Calcium K. K.), 0.1 part of each of three types of antioxidants, "Yoshinox BHT" (trade name, manufactured by Yoshitomi Seiyaku K. K.), "Mark 329" (trade name, manufactured by Adeka Argus Kagaku K. K.) and "Irganox 1076" (trade name, manufactured by Ciba Geigy Co.) and 0.1 part of "Lunac" (trade name of a dispersing agent manufactured by Kao Sekken K. K.) was place in an extruder and melted and kneaded therein. Then, the molten mass was extruded into a sheet through the die of the extruder. The extrusion temperature was 200° C. The extruded sheet was cooled to about 50° C. After being heated to about 135° C., the sheet was then stretched in the longitudinal direction thereof with a stretch ratio of 5 by passing it through a series of rolls respectively having different circumferential speeds.

Each of compositions comprising the olefin resins, the finely divided inorganic materials, the antioxidants, the dispersing agents and the other additives, which are indicated in Table 1, in the indicated proportion, was placed in two separate extruders and melted and kneaded. Then, the molten mass was extruded onto the two sides of the above stretched sheet through the dies of the extruders, thereby to form a laminate. The extrusion temperature was 200° C. The resultant laminate was cooled to a temperature 20° C. higher than room temperature. Then, the laminate was again heated to about 150° C. and stretched in the transverse direction thereof with a stretch ratio of 8 by using a tender. Thereafter, the stretched laminate was set by passing it through an oven at a temperature of 160° C. The resultant film had a three-layer structure consisting of an intermediate layer of the biaxially stretched film having a thickness of 50 microns and outer surface layers of the uniaxially stretched films each having a thickness of 25 microns. This film exhibited excellent printability and writability.

The whiteness and the change in hue of the thus obtained film were evaluated. The results are shown in Table 1.

The resins, finely divided inorganic materials and additives which were used in the outer surface layers were as follows:

Resin:
  Polypropylene "Noblene MA-6"
  High density polyethylene "Yukalon Hard EY-40"
Finely divided inorganic material:
  $CaCO_3$ "Whiton," manufactured by Shiraishi Calcium K. K.
  $TiO_2$ rutile titanium dioxide, manufactured by Ishihara Sangyo K. K.
Antioxidant:
  (i) "Goodlite 3114", manufactured by Goodrich Co: tris(3,5-di-t-butyl-4-hydroxybenzyl)isocyanurate
  (ii) "Mark 329", manufactured by Adeca Argus Kagaku K. K.: a mixture of tri(mononoylphenyl)phosphite and tri(dinonylphenyl)phosphite
  (iii) "Yoshinox BHT," manufactured by Yoshitomi Seiyaku K. K.: 2,6-di-t-butyl paracresol
  (iv) "Irganox 1010," manufactured by Ciba Geigy Co.: tetrakis[3-(4'-hydroxy-3',5'-di-t-butyl)propionyloxymethyl]methane
  (v) "Irganox 1076," manufactured by Ciba Geigy Co.: octadecyl-3-(3,5-di-t-butyl-4-hydroxyphenyl)-propionate
  (vi) "Weston 618," manufactured by Borg Warner Co.: distearyl pentaerythritol diphosphite
  (vii) "Topanol CA," manufactured by ICI Co.: tris(2-methyl-4-hydroxy-5-t-butylphenyl)butane
  (viii) Ionox 330, manufactured by Shell Chemical Co.: 1,3,5-trimethyl-2,4,6-tris(3,5-di-t-butyl-4-hydroxybenzyl)benzene
Dispersing agent:

(i) Oleic acid "Lunac OA," manufactured by Kao Sekken K. K., or "Denon 1578," manufactured by Marubishi Yuka K. K.
(ii) Stearic acid "Lunac S-90," manufactured by Kao Sekken K. K.

Modifying agent against ultraviolet degradation:
(i) "Sanol LS-770," manufactured by Sankyo K. K.: bis(2,2,6,6-tetramethyl-4-piperidyl)sebacate
(ii) "Tinuvin 326," manufactured by Ciba Geigy Co.: 2(2'-hydroxy-3'-t-butyl-5'-methylphenyl)-5-chlorobenzotriazole Method of measurement:
Whiteness: according to JIS L-1074 (a color difference meter manufactured by Suga Shikenki K. K. was used)

Change in hue:
(i) Upon heating
The film was allowed to stand in an oven at a temperature of 120° C. for 100 hours, after which the change in the whiteness of the film was measured.
(ii) Upon atmospheric change
The film was allowed to stand in an atmosphere of gases resulting from the reaction of sodium nitrite and phosphoric acid for 24 hours, after which the change in the whiteness of the film was measured.

TABLE 1

| Example | Formulation | | | | | Evaluation | | | |
|---|---|---|---|---|---|---|---|---|---|
| | Olefin-based resin (part) | Inorganic filler (part) | Antioxidant (part) | Fatty acid (part) | Other additive (part) | Whiteness (%) | Change in hue Thermal | Gas | Other |
| 1 | Polypropylene (60) | Calcium carbonate (40) | Yoshinox BHT (0.075) Mark 329 (0.075) Goodlite 3114 (0.075) | Lunac OA (0.5) | | 93 | No substantial change | No substantial change | |
| 2 | Polypropylene (60) | Calcium carbonate (40) | Yoshinox BHT (0.1) Weston 618 (0.1) Irganox 1076 (0.1) | Lunac OA (0.5) | | 93.5 | No substantial change | No substantial change | |
| 3 | Polypropylene (60) | Calcium carbonate (40) | Yoshinox BHT (0.15) Mark 329 (0.15) Irganox 1076 (0.15) | Lunac OA (0.5) | | 93 | No substantial change | No substantial change | |
| 4 | Polypropylene (60) | Calcium carbonate (40) | Yoshinox BHT (0.1) Weston 618 (0.1) Irganox 1076 (0.1) | Denon 1578 (0.5) | | 93 | No substantial change | No substantial change | |
| 5 | polypropylene (55) polyethylene (5) | Calcium carbonate (40) | Yoshinox BHT (0.075) Mark 329 (0.075) Goodlite 3114 (0.075) | Lunac S.90 (0.5) | | 92 | No substantial change | No substantial change | |
| 6 | polypropylene (55) polyethylene (5) | Calcium carbonate (40) | Yoshinox BHT (0.075) Mark 329 (0.075) Irganox 1076 (0.075) | Lunac OA (1.5) | Sanol LS770 (0.5) | 93 | No substantial change | No substantial change | Excellent weathering resistance |
| 7 | polypropylene (55) polyethylene (5) | Calcium carbonate (35) Titanium dioxide (5) | Yoshinox BHT (0.075) Weston 618 (0.10) Irganox 1076 (0.075) | Lunac OA (0.5) | Sanol LS770 (0.3) | 94 | No substantial change | No substantial change | very excellent weathering resistance |
| 8 | polypropylene (55) polyethylene (5) | Calcium carbonate (35) Titanium dioxide (5) | Yoshinox BHT (0.075) Mark 329 (0.075) Irganox 1076 (0.075) | Denon 1578 (0.5) | Tinuvin 326 (0.3) | 93 | No substantial change | No substantial change | Excellent weathering resistance |
| 9 | polypropylene (55) polyethylene (5) | Calcium carbonate (40) | Yoshinox BHT (0.075) Mark 329 (0.075) Irganox 1076 (0.075) | Denon 1578 (0.5) | | 92 | No substantial change | No substantial change | |
| 10 | Polypropylene (55) Polyethylene (5) | Calcium carbonate (20) Titanium dioxide (30) | Yoshinox BHT (0.075) Weston 618 (0.075) Irganox 1076 (0.075) | Lunac OA (0.5) | | 94 | No substantial change | No substantial change | very excellent whiteness and opaqueness |
| 11 | Polypropylene (55) Polyethylene (5) | Calcium carbonate (60) | Yoshinox BHT (0.075) Weston 618 (0.075) Irganox 1076 (0.075) | Lunac OA (0.5) | | 93 | No substantial change | No substantial change | excellent whiteness & opaqueness |
| Comp. Exam. 1 | Polypropylene (60) | Calcium carbonate (40) | Yoshinox BHT (0.075) Mark 329 (0.075) Topanol CA (0.075) | Denon 1578 (0.5) | | 91 | Yellow | No substantial change | |
| 2 | Polypropylene (60) | Calcium carbonate (40) | Yoshinox BHT (0.075) Mark 329 (0.075) Ionox 330 (0.075) | Denon 1578 (0.5) | | 91 | Yellow | No substantial change | |
| 3 | Polypropylene (60) | Calcium carbonate (40) | Yoshinox BHT (0.1) Mark 329 (0.1) | Denon 1578 (0.5) | | 90 | Yellow | No substantial change | |
| 4 | Polypropylene (60) | Calcium carbonate (40) | Yoshinox BHT (0.1) Irganox 1076 (0.1) | Denon 1578 (0.5) | | 91 | Yellow | No substantial change | |
| 5 | Polypropylene (60) | Calcium carbonate (40) | Yoshinox BHT (0.075) Mark 329 (0.075) Irganox 1010 (0.075) | | | 91 | Yellow | red | poor dispersion of filler |
| | Polypropylene | Calcium | Mark 329 (0.1) | Denon | | | No substantial | No substantial | large change |

TABLE 1-continued

| | Formulation | | | | | Evaluation | | | |
|---|---|---|---|---|---|---|---|---|---|
| | Olefin- | Inorganic | | Fatty | Other | White- | | | |
| Exam- | based resin | filler | Antioxidant | acid | additive | ness | Change in hue | | |
| ple | (part) | (part) | (part) | (part) | (part) | (%) | Thermal | Gas | Other |
| 6 | pylene (60) | carbonate (40) | Irganox 1076 (0.1) | 1578 (0.5) | | 92 | stantial change | stantial change | of MI, forming is difficult |

EXAMPLE 12

A composition comprising 100 parts of polypropylene (available under the trade name of "Noblene MA-6," manufactured by Mitsubishi Petrochemical Co., Ltd.), 20 parts of calcium carbonate (available under the trade name of "Whiton," manufactured by Shiraishi Calcium K. K.), 0.1 part of 6-di-t-butyl-4-methylphenol (available under the trade name of Yoshinox BHT, manufactured by Yoshitomi Seiyaku K. K.), 0.1 part of tri(mono- and di-nonylphenyl)phosphite (available under the trade name of "Mark 329," manufactured by Adeka Argus Kagaku K. K.), 0.1 part of "Irganox 1010" (trade name, manufactured by Ciba Geigy Co.), and 0.3 part of oleic acid (available under the trade name of "Denon 1578," manufactured by Marubishi Yuka K. K.) was placed in an extruder and melted and kneaded therein. Then, the molten mass was extruded into a sheet through the die of the extruder. The extruded sheet was cooled. The resultant sheet was heated to 140° C. and then stretched in the longitudinal direction thereof with a stretch ratio of about 5. Then, the sheet was heated to 155° C. and stretched in the transverse direction thereof with a stretch ratio of 10. The resultant film had a thickness of 80 microns. The whiteness and the change in hue of the film were evaluated. The results are shown in Table 2.

EXAMPLE 13 AND COMPARATIVE EXAMPLE 1-3

For comparison purpose, a film was prepared from each of the compositions indicated in Table 2 according to the procedure described above. The resultant films had a thickness of 80 microns. The whiteness and the change in hue of these films are shown in Table 2. It is apparent from Table 2 that a combination of the particular phenolic antioxidant, the phosphorous antioxidant, and the fatty acid causes the resultant film to exhibit no substantial change in whiteness and hue, while the films produced from the conventional composition exhibit a substantial change in hue.

TABLE 2

| | Formulation | | | | | Evaluation | | | |
|---|---|---|---|---|---|---|---|---|---|
| | Olefin-based resin (part) | Inorganic filler (part) | Antioxidant (part) | Fatty acid (part) | Other additive (part) | Whiteness (%) | Change in hue | | |
| | | | | | | | Thermal | Gas | Other |
| Exam. 12 | Polypropylene (100) | Whiton (20) (calcium carbonate) | Yoshinox BHT (0.1) Mark 329 (0.1) Irganox 1076 (0.1) | Denon 1578 (0.3) | | 94 | No substantial change | No substantial change | |
| Exam. 13 | Polypropylene (100) | Whiton (20) | Yoshinox BHT (0.1) Mark 329 (0.1) Irganox 1076 (0.1) | Lunac OA (0.3) | Titanium dioxide (5) | 94 | No substantial change | No substantial change | |
| Comp. Exam. 7 | Polypropylene (100) | Whiton (20) | Yoshinox BHT (0.1) Irganox 1010 (0.1) | Denon 1578 (0.3) | | 89 | Yellow | Pink | |
| Comp. Exam. 8 | Polypropylene (100) | Whiton (20) | Yoshinox BHT (0.1) Mark 329 (0.1) Topanol CA (0.1) | Denon 1578 (0.3) | | 90 | Yellow | Pink | |
| Comp. Exam. 9 | Polypropylene (100) | Whiton (20) | Mark 329 (0.1) Ionox 330 (0.1) Topanol CA (0.1) | | | 89 | Yellow | No substantial change | large change of MI due to heat |

We claim:
1. A resin composition of improved hue which comprises 100 parts of an olefin-based resin, 3 to 300 parts of finely divided calcium carbonate, 0.05 to 5 parts of a fatty acid having 12 or more carbon atoms and at least three members selected from the following antioxidants (a) through (c) in the stated proportions:
   (a) 2,6-di-t-butyl paracresol, in a quantity of 0.05 to 1 part;
   (b) an antioxidant selected from the group consistng of tri(mono- and/or di-nonylphenyl)phosphite and di-stearyl pentaerythritol di-phosphite, in a quantity of 0.05 to 1 part; and
   (c) an antioxidant selected from the group consisting of tris(3,5-di-t-butyl-4-hydroxybenzyl)isocyanurate and octadecyl-3-(3,5-di-t-butyl-4-hydroxyphenyl)-propionate, in a quantity of 0.05 to 1 part, all parts being by weight.
2. A resin composition as claimed in claim 1 wherein the olefin-based resin is a homopolymer or a copolymer comprising a predominant amount of an olefin selected from the group consisting of ethylene and propylene.
3. A resin composition as claimed in claim 2 wherein the olefin-based resin is a member selected from the group consisting of polypropylene, high density polyethylene, and mixtures thereof.
4. A resin composition as claimed in claim 1 wherein the fatty acid is a member selected from the group consisting of oleic acid, stearic acid, palmitic acid, and mixtures thereof.
5. A resin composition as claimed in claim 4 wherein the fatty acid is oleic acid.
6. A resin composition as claimed in any one of claims 1 to 5 which further comprises titanium dioxide in a quantity of up to 60 parts by weight per 100 parts by weight of the olefin-based resin.

7. A resin composition of improved hue which comprises 100 parts of an olefin-based resin, 3 to 300 parts of finely divided calcium carbonate, 0.05 to 5 parts of a fatty acid having 12 or more carbon atoms, 0.05 to 5 parts of bis(2,2,6,6-tetramethyl-4-piperidyl)sebacate, and at least three members selected from the following antioxidants (a) through (c) in the stated proportions:
   (a) 2,6-di-t-butyl paracresol, in a quantity of 0.05 to 1 part;
   (b) an antioxidant selected from the group consisting of tri(mono- and/or di-nonylphenyl)phosphite and di-stearyl pentaerythritol di-phosphite in a quantity of 0.05 to 1 part; and
   (c) an antioxidant selected from the group consisting of tris(3,5-di-t-butyl-4-hydroxybenzyl)isocyanurate and octadecyl-3-(3,5-di-t-butyl-4-hydroxyphenyl)-propionate, in a quantity of 0.05 to 1 part,
all parts being by weight.

8. A resin composition as claimed in claim 7 wherein the olefin-based resin is a homopolymer or a copolymer comprising a predominant amount of an olefin selected from the group consisting of ethylene and propylene.

9. A resin composition as claimed in claim 8 wherein the olefin-based resin is a member selected from the group consisting of propylene, high density polyethylene, and mixtures thereof.

10. A resin composition as claimed in claim 7 wherein the fatty acid is a member selected from the group consisting of oleic acid, stearic acid, palmitic acid, and mixtures thereof.

11. A resin composition as claimed in claim 10 wherein the fatty acid is oleic acid.

12. A resin composition as claimed in any one of claims 7 to 11 which further comprises titanium dioxide in a quantity of up to 60 parts by weight per 100 parts by weight of the olefin-based resin.

13. A resin composition as claimed in claim 1 or 7 wherein the fatty acid is a monocarboxylic acid having 12 to 22 carbon atoms.

* * * * *